US008949159B2

(12) United States Patent
Krishnakumar et al.

(10) Patent No.: US 8,949,159 B2
(45) Date of Patent: Feb. 3, 2015

(54) SYSTEM AND METHOD FOR AUTOMATIC MERGING OF REAL AND VIRTUAL ENVIRONMENTS

(75) Inventors: Anjur S. Krishnakumar, Princeton, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 495 days.

(21) Appl. No.: 13/354,434

(22) Filed: Jan. 20, 2012

(65) Prior Publication Data
US 2013/0190016 A1 Jul. 25, 2013

(51) Int. Cl.
*G06F 15/18* (2006.01)

(52) U.S. Cl.
USPC ............................................................ 706/12

(58) Field of Classification Search
USPC ............................................................ 706/12
See application file for complete search history.

(56) References Cited

U.S. PATENT DOCUMENTS

| 6,958,677 | B1 | 10/2005 | Carter |
| 7,272,394 | B2 | 9/2007 | Krishnakumar et al. |
| 7,840,668 | B1 | 11/2010 | Sylvain et al. |
| 8,166,485 | B2 * | 4/2012 | Krishnakumar et al. ..... 718/104 |
| 8,230,480 | B2 * | 7/2012 | Fazal et al. .......................... 726/2 |
| 8,245,234 | B2 * | 8/2012 | Krishnakumar et al. ..... 718/103 |
| 8,260,264 | B2 * | 9/2012 | Boyaci et al. ............... 455/412.2 |
| 8,312,239 | B2 * | 11/2012 | Bentley et al. ................. 711/165 |
| 8,416,937 | B2 * | 4/2013 | Bentley et al. ........... 379/203.01 |
| 8,473,423 | B2 * | 6/2013 | Krishnakumar et al. ..... 705/321 |
| 8,499,133 | B2 * | 7/2013 | Bentley et al. ................. 711/165 |
| 8,499,303 | B2 * | 7/2013 | Krishnakumar et al. ..... 718/104 |
| 8,626,237 | B2 * | 1/2014 | Boyaci et al. ................. 455/557 |
| 8,752,054 | B2 * | 6/2014 | Bentley et al. ................. 718/101 |
| 8,774,368 | B2 * | 7/2014 | Bentley et al. ............. 379/32.01 |
| 8,867,013 | B2 * | 10/2014 | Krishnakumar et al. ..... 349/180 |
| 2003/0146835 | A1 | 8/2003 | Carter |
| 2004/0008138 | A1 * | 1/2004 | Hockley et al. .......... 342/357.09 |
| 2004/0137911 | A1 | 7/2004 | Hull et al. |

(Continued)

FOREIGN PATENT DOCUMENTS

| JP | 07306956 A | 11/1995 |
| JP | 2009093478 A | 4/2009 |

(Continued)

OTHER PUBLICATIONS

Enhancing Privacy and Accuracy in Probe Vehicle-Based Traffic Monitoring via Virtual Trip Lines, Hoh, B. ; Iwuchukwu, T. ; Jacobson, Q. ; Work, D. ; Bayen, A. M. ; Herring, R. ; Herrera, J.-C. ; Gruteser, M. ; Annavaram, M. ; Ban, J. Mobile Computing, IEEE Transactions on vol. 11 , Issue: 5 DOI: 10.1109/TMC.2011.116 Pub Year: 2012 , pp. 649-864.*

(Continued)

*Primary Examiner* — Michael B Holmes
(74) *Attorney, Agent, or Firm* — Maldjian Law Group LLC; John Maldjian; Alexander D. Walter (57) ABSTRACT

Method and system to coordinate a virtual environment with a real environment, including: coupling a transceiver to a person; determining a position of the transceiver within the real environment by use of a position-determination module; and rendering the virtual environment to a user by use of a virtual environment server that is configured to determine a position of the transceiver. The method and system may further comprises a wormhole server configured to provide communication services between the user and the person.

20 Claims, 3 Drawing Sheets

(56) References Cited

U.S. PATENT DOCUMENTS

| | | |
|---|---|---|
| 2008/0088438 A1 | 4/2008 | Aninye et al. |
| 2009/0307611 A1 | 12/2009 | Riley |
| 2010/0125799 A1 | 5/2010 | Roberts et al. |
| 2012/0192088 A1 | 7/2012 | Sauriol et al. |

FOREIGN PATENT DOCUMENTS

| | | |
|---|---|---|
| JP | 2009195707 A | 9/2009 |
| JP | 2009271750 A | 11/2009 |

OTHER PUBLICATIONS

Development of traffic sensor system with virtual detection zone, Hardjono, B. ; Nurhadiyatna, A. ; Mursanto, P. ; Jatmiko, W. Advanced Computer Science and Information Systems (ICACSIS), 2012 International Conference on Publication Year: 2012 , pp. 19-23.*

Fleet management and driver supervision using GPS and inertial measurements over GPRS networks Bara, C.P. ; Cretu, I. ; Rosu, I. Intelligent Computer Communication and Processing (ICCP), 2013 IEEE International Conference on DOI: 10.1109/ICCP.2013.6646106 Publication Year: 2013 , pp. 189-192.*

An agent control mechanism in virtual worlds for mobile users Matsubara, K. ; Mizukubo, Y. ; Morita, T. ; Tarumi, H. ; Kusunoki, F Active Media Technology, 2005. (AMT 2005). Proceedings of the 2005 International Conference on DOI: 10.1109/AMT.2005.1505401 Publication Year: 2005 , pp. 475-480.*

Krishnakumar et al., "On the Accuracy of Signal Strength-based Location Estimation Techniques," INFOCOM 2005. 24th Annual Joint Conference of the IEEE Computer and Communications Societies. Proceedings IEEE, Mar. 13, 2005, 9 pages.

Krishnan et al., "A System for Lease: Location Estimation Assisted by Stationary Emitters for Indoor RF Wireless Networks," INFOCOM 2004. Twenty-third AnnualJoint Conference of the IEEE Computer and Communications Societies, Mar. 7, 2004, 11 pages.

Krishnakumar et al., "Theory and Practice of Signal Strength-Based Localization in Indoor Environments," in Localization Algorithms and Strategies for Wireless Sensor Networks, ed. G. Mao and B. Fidan, Information Science Reference, 2009, 3 pages.

Avaya web.alive™, WebAlive2.5FactSheet, avaya.com, Mar. 4, 2011, 4 pages.

Combined UK Search dated Jan. 29, 2013 and UK Examination Report dated Jan. 30, 2013 issued in connection with corresponding UK patent application No. GB1217232.6., 7 pages.

"A Restriction Method of Sensory Information Transmission for Shared Virtual Environment," Nov. 26, 2004, vol. 2004, No. 121, p. 91-96, Report of Research of Information Processing Society of Japan, Information Processing Society of Japan.

Office Action Received for Application Serial No. 2012-214166 mailed Nov. 12, 2013 (7 pages).

Final Office Action Received for Application Serial No. 2012-214166 mailed Mar. 27, 2014 (9 pages).

UK Examination Report dated Jul. 11, 2014, Avaya Inc., issued in connection with corresponding UK patent application No. GB1217232.6., 3 pages.

* cited by examiner

SYSTEM AND METHOD FOR AUTOMATIC MERGING OF REAL AND VIRTUAL ENVIRONMENTS

BACKGROUND

1. Field of the Invention

Embodiments in accordance with the present invention pertain to merging of a real environment and a virtual environment and in particular, coordination of action in the real environment with a depiction in the virtual environment.

2. Description of the Related Art

Virtual reality (VR), also known as virtual world or virtual environment, is a term that applies to computer-simulated environments that can simulate physical presence in places in the real world, as well as in imaginary worlds. Most current virtual reality environments are primarily visual experiences, displayed either on a computer screen or through special stereoscopic displays, but some simulations include additional sensory information, such as sound through speakers or headphones. Some advanced, haptic systems include tactile information, generally known as force feedback, in medical and gaming applications. Furthermore, virtual reality covers remote communication environments which provide virtual presence of users with the concepts of telepresence and telexistence or a virtual artifact (VA) either through the use of standard input devices such as a keyboard and mouse, or through multimodal devices such as a wired glove, motion-tracking technology such as used in systems from Polhemus™, and omnidirectional treadmills. The simulated environment can be similar to the real world in order to create a lifelike experience—for example, in simulations for pilot or combat training—or it can differ significantly from reality, such as in VR games. In practice, it is currently very difficult to create a high-fidelity virtual reality experience, due largely to technical limitations on processing power, image resolution, and communication bandwidth.

Virtual world systems such as Avaya's web.alive™ and Second Life from Linden Labs are used in enterprise environments. Avaya's web.alive is a Web browser plug-in that integrates with existing network, security and business applications to enhance communications, collaboration, and employee or consumer engagement. In this way, web.alive minimizes operational overhead, increases accessibility to users, and delivers face-to-face interaction at the low cost of Web collaboration However, in order to participate and interact with others with conventional virtual world systems, a user has to login to the virtual world and initiate a session. Once the user is logged in, he/she then moves around the virtual world by controlling their avatar manually. The known systems are further limiting because they provide a representation of the user's avatar interacting with a static, pre-defined environment stored in the virtual world system.

This may not be feasible or desired in some situations. For example, a virtual world representing an actual physical trade show needs to have avatars for booth staffers. However, it is impossible for booth staffers who are busy manning the physical booths in the real world to login to the virtual world and manually control their avatars. In this usage context, there may be a lack of coordination between a physical position or status of a booth staffer, and the position or status of the corresponding avatar. This also leads to the inability of the staffers to communicate in any form with the users in the virtual world, leaving the users in the virtual world with no means of establishing an interactive session with the booth staffers.

The known art has drawbacks as discussed above. Therefore, a method and system is needed for improved autonomy in setting up and controlling a virtual world system.

SUMMARY

Embodiments in accordance with the present invention provide improved autonomy when representing users in a virtual environment, substantially without session set-up by a user. Furthermore, embodiments in accordance with the present invention control these users in the virtual world by automatically mirroring their movements from the real world. Two-way communication between users in the virtual environment and those in the real world is enabled.

Optionally, the system may further include a memory coupled to the processor, the memory configured to store instructions such that, when the instructions are performed by the processor, the processor performs the steps of: coupling a transceiver to a person; determining a position of the transceiver within the real environment by use of a position-determination module; and rendering the virtual environment to a user by use of a virtual environment server configured to determine a position of the transceiver.

Embodiments in accordance with the present invention include a system to coordinate a virtual environment with a real environment, including: a transceiver configured to be coupled to a person; a position-determination module configured to determine a position of the transceiver within the real environment; and a virtual environment server configured to render the virtual environment to a user, based upon the position of the transceiver.

Embodiments in accordance with the present invention include a method to coordinate a virtual environment with a real environment, including: coupling a transceiver to a person; determining a position of the transceiver within the real environment by use of a position-determination module; and rendering the virtual environment to a user by use of a virtual environment server configured to determine a position of the transceiver.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines.

DETAILED DESCRIPTION

Embodiments in accordance with the present invention pertain to merging of a real environment and a virtual environment and in particular, coordination of action in the real environment with a depiction in the virtual environment. Communication between persons in the real environment and users of the virtual environment can be established in real time.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

Virtual reality systems provide a virtual environment, in which a person is represented by a computer representation called an avatar. In contrast to the virtual environment, the non-virtual environment is referred to as the "real world" or as the "meat space."

Embodiments in accordance with the present invention build and improve upon a commercially available virtual environment, e.g. web.alive™ from Avaya, by pre-populating the virtual environment with representations of predetermined sets of tracked people from a real world environment. The tracked people may also be referred to herein as "staffers." Pre-populating the virtual environment with tracked people involves content management functions, with controlled access to control of the environment provided at least to individual vendors and/or a show organizer. Initial pre-population of tracked people may be done either by the show organizer or by individual vendors. During usage by virtual attendees, the presence or absence (e.g., taking a break) and location of the tracked people is determined based on the location-estimation technology that is used, which is described below in further detail. Examples of such sets of people include the exhibitors in a booth at a conference, sales personnel at a showroom, agents at a call center, and so forth.

Embodiments in accordance with the present invention may include a status indication in order to indicate a status (e.g., "talking with someone," "available," "not available," etc.). The status indication may be automatically updateable so that the status presented in the virtual world represents the staffer's status in the real world. For example, a status for an automatic update may be inferred by the system from interactions or lack of interactions of the staffer with show attendees.

Embodiments in accordance with the present invention may provide for interactions between groups of people, such as one person addressing a group, or conducting question and answer with a group, or a group that is interacting with another group (e.g., a panel discussion with an audience, or a junior and a senior sales person jointly having discussions with two or more customers). Such a capability may also be useful to allow an external user of the virtual environment to see and be able to interact at the same time with multiple exhibitors at a trade show, as if the external user were walking down an aisle at a trade show.

Embodiments in accordance with the present invention may provide multiple modes of communication or interaction for the staffer. For example, in a first mode of communication the staffer may be able to communicate with virtual users who are within a predetermined vicinity (e.g., when giving a talk to a group of virtual users). In a second mode of communication, a virtual user may initiate a one-on-one interaction with the staffer which cannot be shared by multiple virtual users. The second mode would be useful when discussing confidential information.

Embodiments in accordance with the present invention may provide a capability for an exhibitor to provide video and/or audio to an external user, e.g., a product demonstration, PowerPoint presentation document, product brochure documents, or pictures of an exhibit booth. Documents in the real world may be synchronized with the corresponding documents in the virtual world. For example, if a staffer runs a PowerPoint presentation on his/her PC at the exhibit booth, an agent module on the PC can communicate this information to the virtual world and also synchronize changes to a corresponding PowerPoint presentation presented to the virtual user, as changes to the document happen in the real world.

Embodiments in accordance with the present invention may internally model the virtual world as a small cast of active characters (e.g., staffers) that is a dynamically changing subset of the available actors, the active characters being those staffers who are available for communications with external users. This model may allow for greater continuity over time of a customer experience (e.g., agent expertise) presented to an external user. For example, if an external user ends a first interaction with an avatar but later returns for a second interaction with the same avatar, under this model the external user may be able to continue discussions across the first and second interactions.

Alternatively, the active characters in the virtual world may be associated with the available communication interfaces. Under this model there may be more physical staffers in the real world than available communication interfaces with the virtual world. For example, at a given time there may be five personnel but only three sets of communication equipment, so the virtual environment would show three avatars. This model may allow for different staffers in the real world to come and go, sharing communication equipment as needed.

Embodiments in accordance with the present invention may provide a chat-room capability with an external user. For example, the external user may approach a first avatar and type out a question. If the first avatar is busy, the question could be routed to a second avatar that is available to chat.

Figure 1:
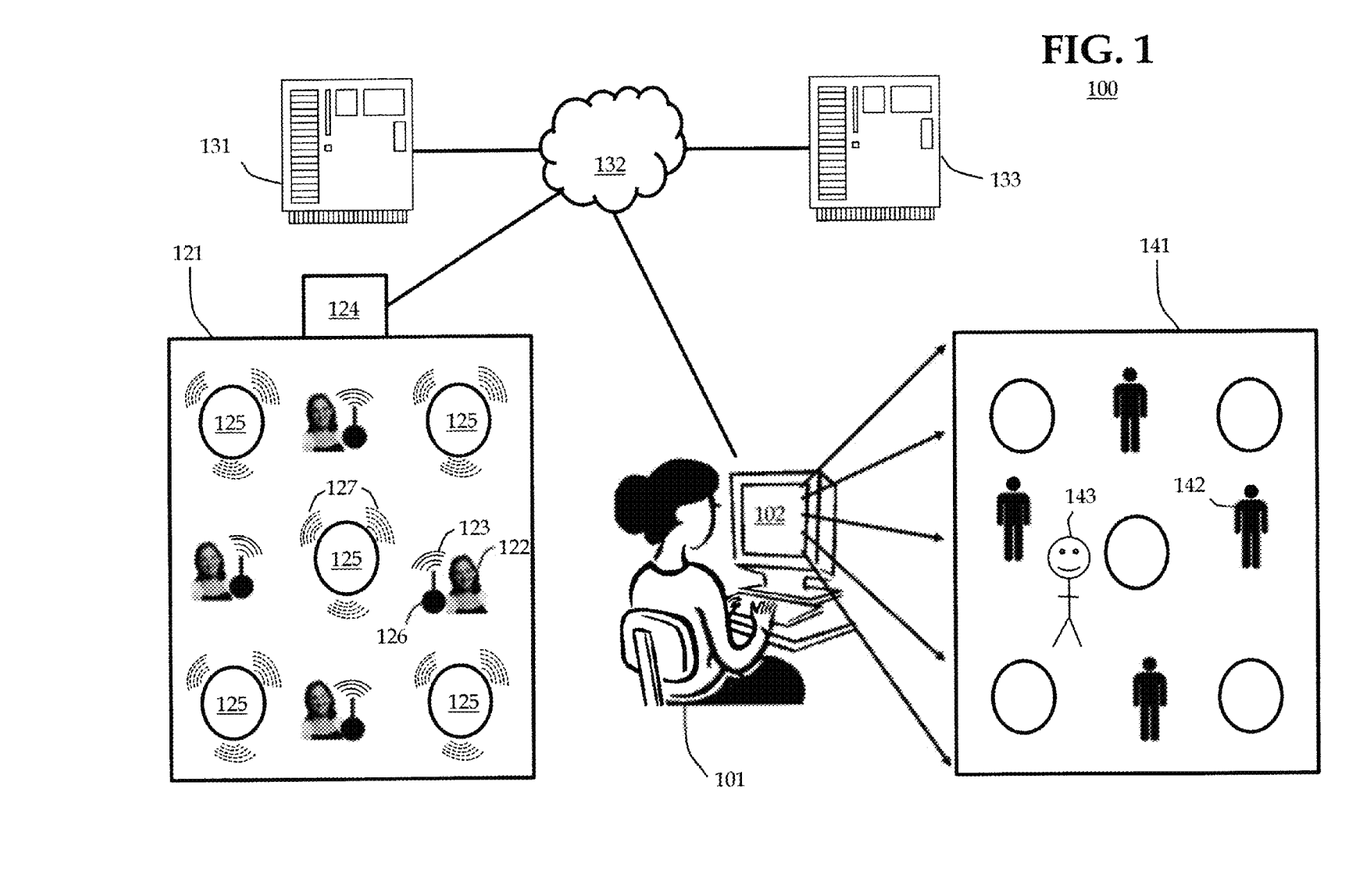
FIG. 1 illustrates a system in accordance with an embodiment of the present invention.

FIG. 1 illustrates a system 100 and usage thereof in accordance with an embodiment of the invention. System 100 illustrates a user 101 who is able to virtually attend an event at a physical space 121 by use of a virtual interface 141 illustrated on screen 102 of the computing device of user 101. Physical space 121 is depicted as a trade show, but embodiments in accordance with the present invention may be used with other types of gatherings, such as a symposium, a lecture, a retail store, a shopping mall, or other group of people. Virtual interface 141 is generated by a wormhole server 131 and/or a virtual world server 133, which are interconnected to the computing device of user 101 by use of a wide area network 132 (e.g., Internet or an intranet), as described below and as depicted at least within FIG. 1.

In other embodiments, physical space 121 may represent more than one location. For instance, physical space 121 may represent a plurality of booths at a convention or a plurality of stores in a shopping mall or a plurality of presentation rooms at a symposium, some of which may not necessarily be physically adjacent.

The computing device of user 101 may include a processor, a memory coupled to the processor, a receiver, transmitter, and/or transceiver to couple an internal and/or external communication path to the processor, and/or one or more user input/output (I/O) devices (e.g., display screen, keyboard, mouse, etc.). The memory stores data and/or program instructions used by the processor. The memory may include permanent, non-volatile memory (e.g., ROM, or volatile memory (e.g., RAM), or rewritable memory (e.g., hard drive or flash memory), or any combination thereof. The program instructions, when executed by the processor, carry out the processes performed by the computing device of user 101.

Physical space 121 is populated by one or more persons 122 who are stationed at the event, such as workers at a trade show, or invited guests at a symposium, etc. As persons 122 move around at physical space 121, their movements are tracked and a corresponding avatar 142 is moved accordingly in virtual interface 141. User 101 is represented in virtual interface 141 by another avatar 143. User 101 is able to interact with persons 122 by manipulating avatar 143 to interact with avatars 142.

Physical space 121 also includes one or more predetermined locations 125, such as kiosks, that may contain information useful to user 101. Persons 122 may move among or near one or more predetermined locations 125. A local communications hub 124 provides a communication interface with physical space 121, as described below.

In one embodiment in accordance with the invention, predetermined locations 125 may contain a relatively low-power transmitter that transmits a beacon signal 127. Wireless transmission technology used for this purpose may include the IEEE 802.11 wireless protocol (i.e., WiFi), IEEE 802.15.4 (i.e., ZigBee), Bluetooth®, and so forth. Bluetooth is known in the art as a proprietary open wireless technology standard for exchanging data over short distances (using short wavelength radio transmissions in the ISM band from 2400-2480 MHz) from fixed and mobile devices, creating personal area networks (PANs) with high levels of security. At least some of persons 122 carry with them a transceiver 126 that receives beacon signals 127. Transceiver 126 includes an interface at least to a microphone and earpiece in order to support a voice communication channel to and from person 122. Transceiver 126 may also include a camera for a video communication channel at least from person 122.

Transceiver 126 may further provide a communication interface 123, which is in communication with local communication hub 124. Communication interface 123 is depicted as a wireless interface in order to improve mobility of persons 122 within physical space 121. Communication interface 123 supports the voice communication channel to and from person 122, and may also support the video communication channel if used. However, other interfaces such as a wired interface may be used, for instance if higher bandwidth may be desirable in order to support video communication, or if persons 122 are relatively immobile such as at a panel discussion or poster session at a symposium.

A location of person 122 within physical space 121 may be determined by use of beacon signals 127 and radio position determination methods. For instance, receiving raw signals from three or more predetermined locations 125 may enable determining the location of person 122 by way of triangulation. Location of person 122 may alternatively be determined by which beacon signal 127 is received with the highest strength, best quality, etc., and associating the position of person 122 with the location of corresponding predetermined location 125. Location calculations (e.g., triangulation calculations, signal strength comparisons) may be performed by transceiver 126 based upon the received beacon signals 127. Alternatively, transceiver 126 may pass beacon signals 127 (or values derived therefrom) to an upstream computing device such as wormhole server 131 for performing the location calculations.

Substantially each of beacon signals 127 is identifiably associated with a predetermined location 125, for instance by way of a substantially unique identifier (e.g., a transmission frequency, a transmitted ID number, a PN spread spectrum code, time division multiplexing, frequency division multiplexing, and so forth). Such methods are familiar to persons of skill in the art.

Wormhole server 131 bridges physical space 121 and virtual interface 141 by automatically representing persons 122 in virtual interface 141, and initiating communication between a virtual trade show attendees such as user 101 and persons 122 at physical space 121. Wormhole server 131 is capable of tracking, calculating and/or maintaining a status of persons 122, and reporting the status to virtual world server 133. Wormhole server 131 may include characteristics of persons 122, such as a name, job function, specialty, and so forth. Wormhole server 131 may include support for Session Initiation Protocol ("SIP", IETF 2543 and/or 3261), H.323, and/or real-time transport protocol ("RTP", IETF RFC 3550 and/or 3551), in order to provide audio and/or video communications between persons 122 and user 101.

Wormhole server 131 gathers information from the real world (e.g., location information) and conveys it to Virtual space server 133. Wormhole server 131 also receives information from virtual space server 133 and interprets the information into appropriate actions in the real world (e.g., initiating a telephone call).

Virtual space server 133 is responsible for interpreting the information from Wormhole server 131 (e.g., location information) and translating the information into appropriate actions in the virtual world (e.g., moving the avatars). Virtual space server 133 and wormhole server 131 ordinarily may be configured as peers interacting with each other rather than being configured in a master/slave combination.

Wormhole server 131 may include a processor, a memory coupled to the processor, a receiver, transmitter, and/or transceiver to couple an internal and/or external communication path to the processor, and/or one or more user input/output (I/O) devices (e.g., display screen, keyboard, mouse, etc.). The memory stores data and/or program instructions used by the processor. The memory may include permanent, non-volatile memory (e.g., ROM), or volatile memory (e.g., RAM), or rewritable memory (e.g., hard drive or flash memory), or any combination thereof. The program instructions, when executed by the processor, carry out the processes performed by wormhole server 131.

Status of persons 122 may include their physical position within physical space 121, as determined by radio position determination methods described herein. Status may also include an availability of person 122 or an indication of their activity or level of activity, e.g., whether person 122 is already engaged in communication with user 101 or a different user, or may be otherwise unavailable, etc. If person is engaged with another user other than user 101, status may include a representation of the other user.

User 101 may interact with representations of other users, including being able to listen to a conversation as is possible at an actual conference, upon the setting of appropriate permissions (e.g., that a user has access to this capability) and/or attributes (e.g., that a pre-determined conversation is not private). For example, virtual world systems such as the Avaya web.alive may provide a capability for virtual users to interact with other virtual users through the virtual world and/or listen to any public conversations between virtual users or between virtual users and booth staffers.

Status may be controlled by person 122, e.g., by setting a switch on transceiver 126, by uttering a phrase or signal recognized by wormhole server 131 (e.g., "off," "on," "hold," "transfer," "conference," etc.), and so forth. Status may also be inferred, such as if transceiver 126 does not move for more than a predetermined amount of time, or is oriented at an unusual angle (e.g., sideways), which may indicate that person 122 took off transceiver 126.

Virtual space server 133 uses status information about persons 122, as supplied by wormhole server 131, in order to render the locations or depictions of avatars 142 on virtual interface 141, as illustrated on screen 102 of the computing device of user 101. The depictions of avatars 142 may include an indication of availability—for instance, if a person 122 is not available then the corresponding avatar 142 maybe rendered in a different color, or grayed out, or blinking, or having some other status indicator on screen, and so forth. Control commands by user 101 (e.g., movement, request to talk, etc.) are communicated to virtual space server 133, which then provides the corresponding movement and control of avatar 143 based upon the control commands from user 101. Virtual space server 133 may provide other functions to allow user 101 to communicate with the virtual world, or if enabled, with other similar external users in order to allow for collaboration. Virtual space server 133 may also provide security functions such as logins, ID management, personalization, privilege levels, and so forth. Virtual space server 133 may also interact with wormhole server 131 in order to synchronize changes made to documents in the real world with changes made to corresponding documents presented in the virtual world.

Figure 2:
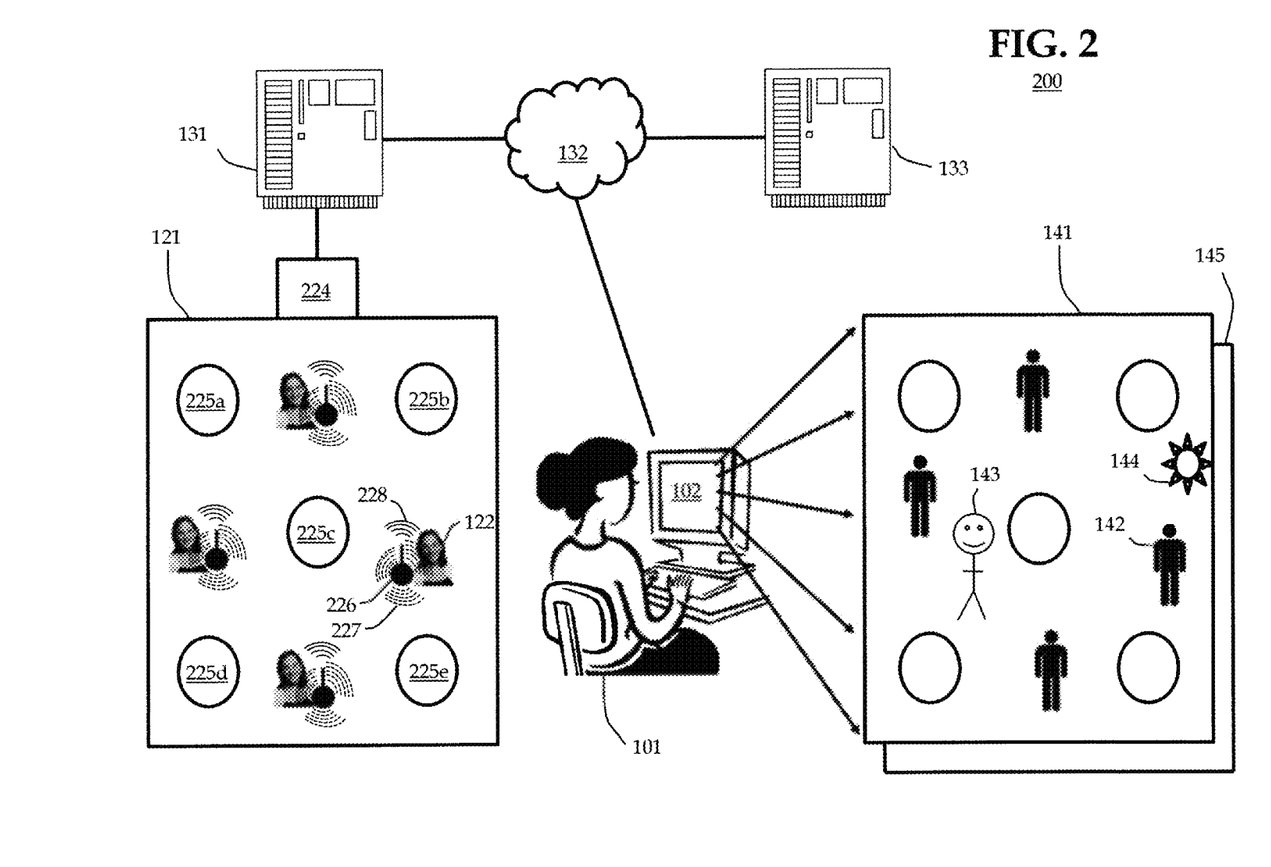
FIG. 2 illustrates another system in accordance with an embodiment of the present invention.

In operation of system 200, user 101 may move their avatar 143 to be near an avatar 142, and then issue a command to begin communicating with the person 122 corresponding to avatar 142. Alternatively, the act of user 101 moving avatar 143 sufficiently close to avatar 142 may be recognized by wormhole server 131 and/or virtual space server 133 as being a cue (or inferred command) to initiate communication between user 101 and person 122. Upon recognition of the command, inferred command, cue or the like, and if person 122 is available according to their status, a communication session may be established by wormhole server 131 between user 101 and person 122. Initially, the communication session may include just a chat session or a voice channel set up by use of known protocols such as SIP, H.323. etc. The communication session may be treated like any other call, such as being put on hold or being transferred, to the extent of communication services supported by wormhole server 131. A chat session may be supported by a speech to text conversion module accessible to person 122, so that person 122 does not need to use a keyboard.

During communication between user 101 and person 122, it may become desirable to include a live video communication channel. Either user 101 or person 122 may initiate a request through an available command. The command will initiate an exchange of SIP messages to set up a video channel. If sufficient resources such as bandwidth are available, particularly between transceiver 126 and local communications hub 124, an RTP session may be established. If sufficient resources are not available, then the request will be denied and user 101 and person 122 will be so informed.

During communication between user 101 and person 122, it may also become desirable to refer to visual materials, usually from person 122 to user 101. Visual materials may include a PowerPoint presentation, a PDF (e.g., a product brochure or manual), a video clip, and so forth. The audio and video to/from user 101 is provided through the interfaces provided by the virtual world system. For example, the virtual world system may provide a pre-determined "surface" that has an ability to show viewgraphs or share a desktop with the virtual user. Information from the real world (e.g., a desktop of a booth staffer, or slideshow, etc.) can be made available inside the virtual world system environment on the surface. Additionally, changes made to a document or its status in the real world, e.g. forwarding a PowerPoint document, may also be synchronized with the virtual world.

FIG. 2 illustrates a system 200 and usage thereof in accordance with another embodiment of the invention. Transmitter 226, carried by person 122, transmits a beacon signal 227 that is received by one or more predetermined locations 225a-e. Receivers at predetermined locations 225a-e measure the received signal strength. A position of person 122 can be approximated by determining which of predetermined location 225a-e is receiving the strongest signal from transmitter 226. A more precise position determination can be made by other methods, for instance triangulation techniques or by comparing the relative received signal strengths of transmitter 226 at the various predetermined locations 225a-e. For instance, using the configuration shown in FIG. 2, if the signal received at locations 225b and 225c are about the same, but less than the signal received at locations 225a and 225e, then person 122 should be located near the midpoint between locations 225b and 225c. This calculation would assume negligible interferences from reflections or blockage of beacon signal 227 (whether blocked by an object within physical space 121 or by the body of person 122). Embodiments in accordance with the present invention may be usable with position-determination methods described in at least: U.S. Pat. No. 7,272,394 to Krishnakumar et al.; Krishnakumar et al., "On the accuracy of signal strength-based estimation techniques," INFOCOM 2005; and Krishnan et al., "A system for LEASE: location estimation assisted by stationary emitters for indoor RF wireless networks," INFOCOM 2004, all of which are incorporated by reference in their entireties.

The signal strengths from substantially each of the predetermined locations 225a-e is communicated via a communications path (not shown) between predetermined locations 225a-e and communication hub 224, and then to wormhole server 131 which performs the position calculations.

Each transceiver 226 may transmit beacon signal 227 having transmission characteristics that facilitate operation of system 200 using multiple transceivers 226, such as a substantially unique identifier (e.g., a transmission frequency, a transmitted ID number, a PN spread spectrum code, time division multiplexing, frequency division multiplexing, and so forth). Such methods are familiar to persons of skill in the art.

Transceiver 226 further supports a bi-directional communication link between transceiver 226 and communication hub 224. In one embodiment in accordance with the present invention, signal 227 is usable as both a beacon and to support the bi-directional communication link. In another embodiment, a separate communication interface 228 distinct from beacon signal 227 may be used to support the bi-directional communication link. Communication interface 228 supports the voice communication channel to and from person 122, and may also support the video communication channel if used. However, other interfaces such as a wired interface may be used, for instance if higher bandwidth may be desirable in order to support video communication, or if persons 122 are relatively immobile such as at a panel discussion or poster session at a symposium.

Configuring transceiver 226 to provide a signal 227 that is usable as both a beacon and to support the bi-directional communication link may provide advantages such as a smaller transceiver 226, and lower power consumption by transceiver 226.

System 200 further illustrates that local communication hub 224 may be in direct communication with wormhole server 131, without a communication passing through wide area network 132. This communication interface may also be usable in the embodiment of FIG. 1. In this configuration, communication hub 224 may be merged with, or be a portion of, wormhole server 131. In such a configuration, wormhole server may be substantially co-located with physical space 121.

FIG. 2 further illustrates that virtual space 141 may include one or more information points 144. If user 101 moves their avatar 143 to information point 144, user 101 is provided additional information relevant to information point 144, which may include transporting avatar 143 to another location within virtual space 141, or to another virtual space 145 altogether, which is better equipped to provide the information needed by user 101. Alternatively, moving avatar 143 to within a pre-determined distance of information point 144 may transport avatar 143 to an avatar associated with the information point (not illustrated in FIG. 2).

Note that persons 122 do not have to explicitly login and control their avatars 142. The locations of persons 122 in physical space 121 are automatically tracked using localization technology (e.g., IEEE 802.11 WiFi, IEEE 802.15.4 Zig-Bee, Bluetooth®, and so forth), and automatically reflected in virtual space 141. When an external user 101 who is logged in to the virtual space 141 approaches and initiates contact with avatar 142 of person 122, two-way communication is automatically initiated in the real-world between user 101 and person 122.

Other portions of FIG. 2 not specifically described operate in a similar manner to similarly-numbered elements of FIG. 1.

Figure 3:
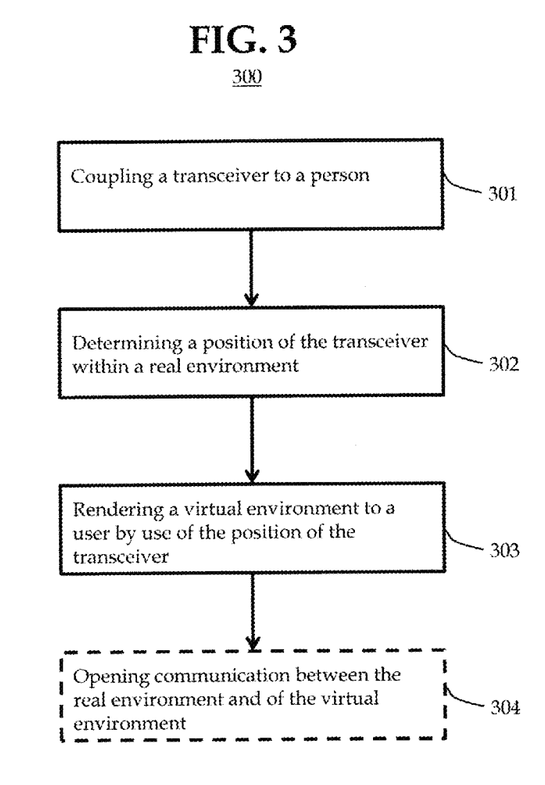
FIG. 3 illustrates a method in accordance with an embodiment of the present invention.

FIG. 3 illustrates a method 300 in accordance with an embodiment of the invention. Method 300 is usable with either system 100 of FIG. 1 and/or system 200 of FIG. 2. At step 301, a transceiver is coupled to a person in the real world, such as a staffer at a trade show booth. The transceiver sends and/or receives signals that are usable to locate a position of the transceiver (and the person it is coupled to) in relation to the real world environment.

At step 302, a position of the transceiver within the real environment is determined, for instance by using methods described in relation to system 100 of FIG. 1 and/or system 200 of FIG. 2. The position information will be communicated to a virtual world server and/or a wormhole server, for production of a virtual environment.

At step 303, a virtual environment is rendered (i.e., displayed to) to a user by use of the position information from step 302.

At optional step 304, a communication channel is opened between the real environment and the virtual environment. For instance, the communication may be between the person in the real environment and the user of the virtual environment. Or the communication may be of an audio/visual presentation available in the real environment with the user of the virtual environment. The communication channel may be opened when respective avatars corresponding to the person and the user approach each other, or when the avatar of the user approaches a pre-determined location, or when the user indicates a desire to open communications. Other combinations and scenarios are possible regarding the communication channel and how it is opened.

Persons of skill in the art will recognize that additional optional steps of method 300 may be performed, in light of system 100 of FIG. 1 and/or system 200 of FIG. 2.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the present invention to the precise form disclosed. Modifications and variations are possible in light of the above teachings or may be acquired from practice of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A system to coordinate a virtual environment with a real environment, comprising:
   a transceiver configured to be coupled to a person;
   a position-determination module configured to determine a position of the transceiver within the real environment;
   a virtual environment server configured to render the virtual environment to a user, based upon the position of the transceiver; and
   a wormhole server configured to provide communication services between the user and the person.

2. The system of claim 1, further comprising one or more beacon transmitters at predetermined locations within the real environment, the beacon transmitter configured to transmit a signal to the transceiver.

3. The system of claim 1, further comprising one or more receivers at predetermined locations within the real environment, the receivers configured to receive a beacon signal from the transceiver.

4. The system of claim 3, wherein the beacon signal is further configured to provide a communication link to a wormhole server that is configured to provide communication services between the user and the person.

5. The system of claim 1, wherein the wormhole server is configured store a status of the person, and to provide communication services between the user and the person based upon the status.

6. The system of claim 1, wherein the virtual environment comprises an avatar corresponding to the person and an avatar corresponding to the user, wherein a position within the virtual environment of the avatar corresponding to the person is determined from the position determined by the position-determination module.

7. The system of claim 6, wherein a communication channel between the user and the person is opened when the avatar corresponding to the user within a predetermined distance of the avatar corresponding to the person.

8. The system of claim 1, wherein the communication services between the user and the person includes a visual display.

9. The system of claim 6, wherein the virtual environment further comprises an information point configured to provide information to the user when the avatar corresponding to the user is positioned within a predetermined distance to the information point.

10. The system of claim 1, wherein changes to documents in the real environment are synchronized with changes to documents in the virtual environment.

11. A method to coordinate a virtual environment with a real environment, comprising:
    coupling a transceiver to a person;
    determining a position of the transceiver within the real environment by use of a position-determination module;
    rendering the virtual environment to a user by use of a virtual environment server configured to determine the position of the transceiver; and
    providing communication services between the user and the person by use of a wormhole server.

12. The method of claim 11, further comprising the step of transmitting a signal to the transceiver by use of one or more beacon transmitters at predetermined locations within the real environment.

13. The method of claim 11, further comprising the step of receiving a beacon signal from the transceiver, by use of one or more receivers at predetermined locations within the real environment.

14. The method of claim 13, further comprising the step of providing communication services between the user and the person is by use of a communication link to a wormhole server.

15. The method of claim 11, further comprising the step of storing a status of the person by the wormhole server, and providing communication services between the user and the person based upon the status.

16. The method of claim 11, further comprising the step of determining a position, within the virtual environment, of at least one of the avatar corresponding to the person and an avatar corresponding to the user, by use of the position determined by the position-determination module.

17. The method of claim 16, further comprising the step of opening a communication channel between the user and the person when the avatar corresponding to the user is within a predetermined distance of the avatar corresponding to the person.

18. The method of claim 11, wherein the communication services between the user and the person includes a visual display.

19. The method of claim 16, further comprising the step of providing information to the user in response to the avatar corresponding to the user being within a predetermined distance to an information point in the virtual environment.

20. The method of claim 11, further comprising the step of synchronizing changes to documents in the real environment with changes to documents in the virtual environment.

* * * * *